Fig. 1

May 28, 1963 H. W. HEISTERKAMP ET AL 3,090,998
MANUFACTURE OF TUBULAR THERMOPLASTIC FILM
Original Filed June 2, 1958

INVENTORS.
Herbert W. Heisterkamp
Walter S. Lodegaard

BY Jerome Rudy
ATTORNEY

United States Patent Office 3,090,998
Patented May 28, 1963

3,090,998
MANUFACTURE OF TUBULAR THERMOPLASTIC FILM
Herbert W. Heisterkamp, Cleveland, and Walter S. Ladegaard, Avon Lake, Ohio, assignors to The Dow Chemical Company, Midland, Mich., a corporation of Delaware
Continuation of application Ser. No. 739,027, June 2, 1958. This application Apr. 17, 1961, Ser. No. 103,656
18 Claims. (Cl. 18—57)

This application is a continuation of the copending, but herewith abandoned, application for United States Letters Patent having Serial Number 739,027, which was filed June 2, 1958.

The present invention contributes to the art of manufacturing film from thermoplastic resinous materials. In particular, this invention relates to an improved and highly advantageous method and apparatus for the manufacture, in tubular form, of relatively thin film from various film-forming thermoplastic resinous materials. It has more particular reference (but is not restricted) to a method and apparatus especially useful for the production of film from the normally crystalline polymers and copolymers of vinylidene chloride.

One frequently employed technique for making film in tubular form from various film-forming thermoplastic resinous compositions, including the normally crystalline vinylidene chloride (i.e., saran) compositions, involves the continuous extrusion of a tube of fused polymer into a temperature regulating bath, wherein the tube is flattened between pinch rolls while a head or column of a liquid is maintained within the freshly extruded tube prior to its flattening. The internal liquid column is primarily employed to effect size control of the hot, freshly extruded tube, although it may also assist in the cooling of the tube and, in addition, may exert a secondary beneficial influence in accomplishing lubrication of the interior surfaces of the tube to avoid cohesion of the inner walls after the tube has been flattened. This general procedure is disclosed and exemplified in United States Letters Patents Nos. 2,452,080 to Stephenson and 2,488,571 to Trull. When such a procedure is followed, however, difficulties may often be encountered in suitably regulating the temperature of the freshly extruded tube as well as in the precise and uniform control of film gauge, especially in thinner film products. Difficulty may also arise in the ultimately produced film product because of the presence of the liquid from the internal column on the interior surfaces of the tube, especially when a lubricating liquid, such as mineral oil, is employed in the column. While, for some purposes, the presence of a liquid lubricant on the inner surface of the film product may be tolerable, it is a decided disadvantage under certain circumstances and in many situations.

Another method that is used for the manufacture of film in tubular form involves extrusion of the tube over an internal cooling mandrel which is placed immediately beneath the circumferential extrusion orifice. Such a procedure is illustrated in United States Letters Patent No. 2,720,680 to Gerow. Similar operation involving use of an internal distending film guide is disclosed in United States Letters Patent No. 2,641,022 to Kress. Still another process for manufacturing tubular film involves the use of an external cooling ring about a film tube that, immediately upon extrusion, is inflated with gas under pressure prior to flattening pursuant, for example, to the teachings in United States Letters Patent No. 2,461,975 to Fuller. When any of the last mentioned techniques are employed, however, it is frequently difficult or inconvenient to provide effective and entirely satisfactory temperature regulation and precisely controlled rate of cooling of the freshly extruded film tube. As a consequence, many of the known tubulation procedures are not at all adapted for the preparation of films from certain thermoplastic materials, such as the sarans, which require to be supercooled immediately after extrusion and prior to orientation if a satisfactory product is to be obtained.

It would be an advantage to provide a new and improved method and apparatus for the manufacture of tubular film from practically any desired thermoplastic film-forming material wherein a much more precise and readily effected control of the temperature of the freshly extruded film could be achieved. It would also be an advantage if film tubes could be manufactured in such a way that difficulty due to the use of internal liquid columns (including columns of lubricants) could be avoided. It would be a particular advantage if such method and means of manufacturing film tubes could be utilized for the production of tubular saran film, as well as in the production of many other relatively thin gauge films comprised of other desired varieties of thermoplastic fiber- and film-forming materials. It would be especially advantageous if a new and improved technique for the manufacture of film in tubular form could be provided to facilitate the preparation of film of constantly uniform thickness and overall premium quality for many of a variety of thermoplastic film-forming materials. It would be a pronounced advantage if tubular film in a wide range of tube diameters could be produced by a new technique without requiring changes in the extruder and die head for each particular tube size desired.

Therefore, the principal object of the present invention is to provide an improved method and apparatus for the preparation of tubular film from thermoplastic resinous materials.

A particular object of the invention is to provide an improved method and apparatus for such operation in which close and accurate temperature control is readily achieved upon and in the freshly extruded product.

A further object of the invention is to facilitate the manufacture of a uniform high quality and regularly constant gauge or thickness film product.

An associated object of the invention is to provide a method and apparatus adapted for the manufacture of tubular film wherein, if desired or necessitated, difficulties due to deposition of liquid lubricants on the internal surfaces of the film tube might easily be avoided.

Yet another object of the invention is to provide a method and apparatus that are exceptionally well suited for the manufacture of continuous film tubes having efficiently and effectively deposited on their inner surfaces internal solid lubricants or slip agents to prevent internal sticking of the tube.

Still another object of the invention is to furnish a method and apparatus for the production of film tubes wherein desired treatment of the exterior surface of the freshly extruded film with any variety of beneficial treating liquid might be easily and conveniently accomplished simultaneous with extrusion.

A still further object of the invention is to provide a new and improved method for the manufacture of tubular film and apparatus means for its accomplishment capable of readily and easily providing excellent quality product in a wide range of tube diameters using a single size extruder and die head for the purpose.

Another significant object of the invention is to provide an apparatus and method that would be especially well suited for the manufacture of various saran films in tubular form.

The foregoing and related objects are possibilitated by manufacturing a film tube of a thermoplastic, resinous, film-forming material in a manner wherein a fused, thermoplastic film-forming composition is extruded downwardly through a tube die; withdrawing said freshly extruded, seamless film tube from the die downwardly, advantageous (but not necessarily) over an internal, generally circular, tube distending or merely supporting centering guide or mandrel (or alternatively, through an external contacting tube guide or without any film-contacting guide whatever), through (or over) and by a tube flattening means positioned under said die and aligned beneath said internal tube forming mandrel when one is employed (which flattening means may optionally also be a drawing means); and continuously applying to the exterior of said tube immediately after its extrusion and prior to its flattening a circumenveloping peripherally cascading column of a temperature regulating liquid which is at a desired temperature or sequence of temperatures (i.e., constant and uniform or sequentially varied and non-uniform) beneath the thermoplastic fusion temperature of the resinous composition in said film.

Advantageously, particularly when saran films are being prepared, the temperature regulating liquid may be an aqueous cooling (or supercooling) liquid. In cany cases, however, after the initial cooling and setting has been accomplished, at least a portion of the temperature regulating liquid in the cascading column may be at a different temperature for regulation of the film temperature than that of the initial portion in the cascading liquid column which first contacts the tube. Thus, the subsequent part of the liquid may be at a higher temperature in order to warm the freshly extruded film to an optimum temperature for orientation in any desired manner (such as by internal distention with gas bubbles and the like). Or, if desired, the subsequent portion of the liquid may be still cooler than the first portion to afford yet additional chilling and generally more positive setting of the film. Likewise, the liquid may have other beneficial effects upon the freshly extruded film besides and in addition to mere temperature regulation. Thus, it may be adapted to simultaneously plastify, soften or impart lubricity to the freshly extruded film or it may be adapted to apply antistatic agents, fire-retarding agents, certain types of stabilizers, dyestuffs, bleaches and various other treating, impregnating, conditioning or coating agents, or suitable operable and desired mixtures thereof, as may be beneficial under the needs and requirements of particular situations. In any event, as is hereinafter more fully delineated, the flowing liquid cascade exerts a most beneficial shape stabilizing influence on the freshly extruded tube.

It is oftentimes advantageous to circulate within the tube being extruded a dust-laden or dust-bearing gas in order to deposit a substantially uniform coating of dust or solid slip agent in pulverulent form on the inner surface of the tube prior to its flattening. This tends to prevent interior cohesion and sticking of said tube after it has been flattened. Of course, if desired, liquid slip agents can also be sprayed within the freshly formed tube on its interior surface. In addition, in instances when relatively tough and rigid tubes of certain film forming materials are being extruded which have only slight, if any, tendency to collapse, the use of an interior guide means of any variety may be completely dispensed with.

Further features and the many cognate benefits and associated advantages of the invention will be additionally manifest in the ensuing description and specification, which, as it is described, may be better understood with reference to the accompanying drawing wherein.

Figure 1:
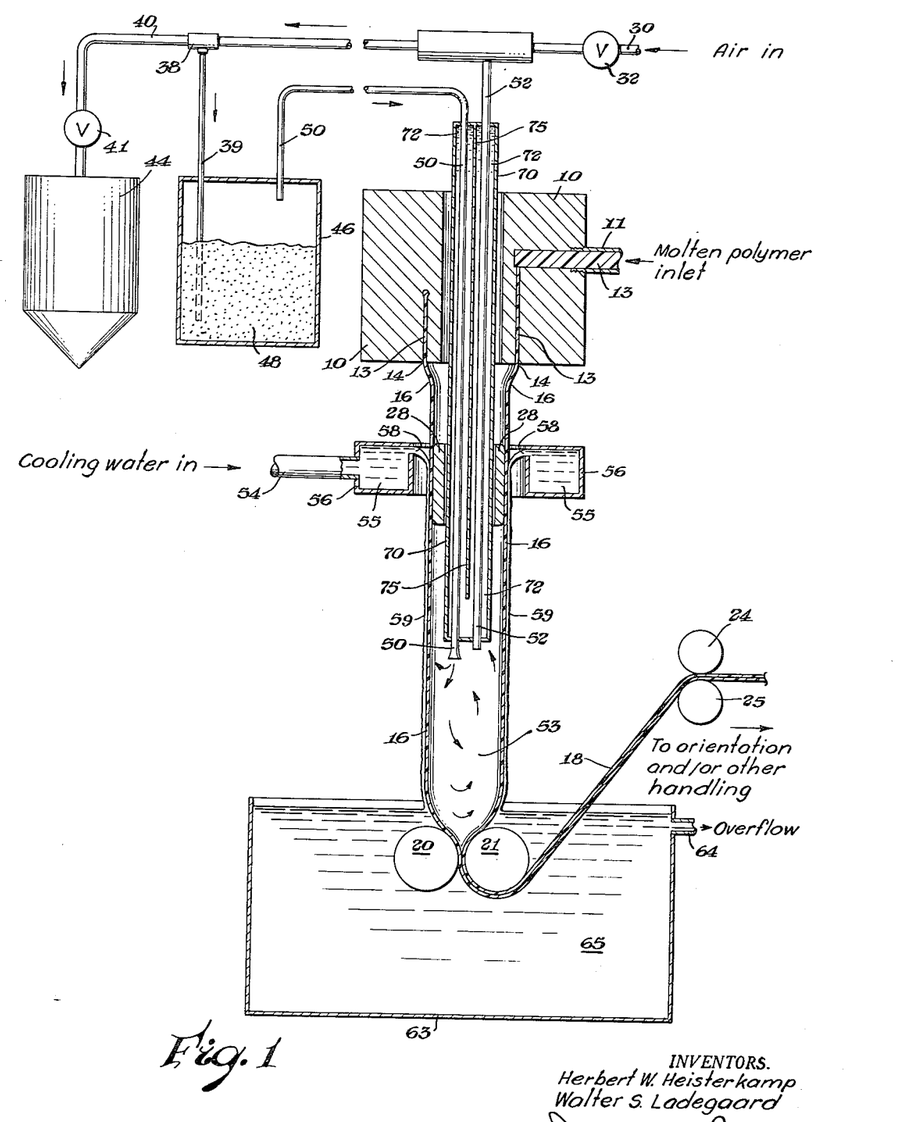
FIGURE 1 is a schematic representation, in partially sectional elevation which is partially diagrammatic, showing the essential elements and combinations of one embodiment of the method and an apparatus for manufacturing tubular film in accordance with the invention, wherein product suitable for subsequent orientation or other use and handling is obtained.

With initial reference to FIGURE 1, there is schematically portrayed the essentials of an operation according to the present method utilizing an apparatus embodiment adapted for its accomplishment. A tube die 10 of any generally conventional or otherwise desired variety is employed for the extrusion. The die 10 is fed through an inlet conduit 11 with a fused or molten film-forming, resinous or polymeric composition 13, such as a film-forming saran composition or other suitable or desired film-forming material. The molten resinous composition 13 is provided under suitable extrusion pressure from a supply source (not shown) such as a fluid-forwarding metering gear pump or its equivalent or an extruded or the like apparatus. The molten composition is extruded through the generally circular ring-like orifice 14 of the tube die 10 to form the freshly extruded film tube 16 of the composition. Although in most cases it is satisfactory for the tube die to have a circular or at least nearly circular orifice, it may also be suitably formed in oval, elliptical and other forms that are merely generally circular in outline.

Advantageously, as indicated, the tube die 10 is positioned so as to extrude the seamless tube vertically downwardly, or at least substantially so, for its ultimate flattening and forwarding by and between the bight of a pair of cooperating nip or pinch rolls 20, 21 or an equivalent flattening means. Of course, some deviation from a strictly vertical, say 5-10° or so, can be tolerated without difficulty in the practice of the invention. The rolls 20, 21 may either be idler or driven rolls, depending whether a mere collapsing or a forwarding and withdrawing action is desired by such installation. When nip roll pairs are employed, whether they idle or are driven, their compressive effect should be light to avoid an undesired calendering or welding action on the freshly extruded tube. As is apparent, of course, the flattening need not be accomplished by a pair of rolls. Frequently a single roller or a suitable guide bar can be satisfactorily employed for the tube flattening, since the sharp change in direction of the tube about a single roll or guide serves to effectively collapse and seal the tube. The freshly extruded polymer tube 16, as indicated, is advantageously passed about an internal distending guide or mandrel 28 of a suitable dimension and outline (corresponding to that of the orifice 14) to maintain the film in tubular form during its extrusion until its purposeful flattening between the nip rolls 20, 21. The internal guide or mandrel 28, which accurately maintains the film tube on the center line of extrusion and controls its characteristics, is generally affixed so as to physically depend from and be supported by the tube die by means not shown, in a manner readily apparent to those skilled in the art. The diameter of the internal guide or former 28 may be selected to best accommodate the type of film being extruded. Although it is shown in the FIGURE 1 as having a smaller diameter than the extrusion orifice 14, mandrels having larger diameters so as to cause a slight or even considerable expansion of the film tube immediately after its extrusion may also be utilized. Such features, of course, depend upon the particular film-forming material being extruded and the processing techniques best adapted for its handling.

Figure 4:
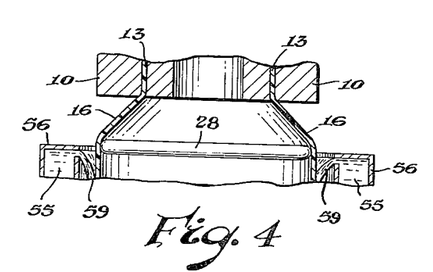
FIGURES 4 and 5 are schematic illustrations, in fragmentary cross-sectional views, of extrusion operations in accordance with the invention wherein the film tubes are being expanded and contracted, respectively, over the interior contacting guide mandrels.
Figure 5:
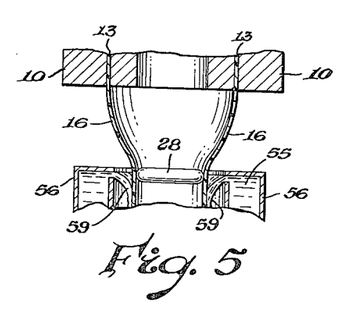

In FIGURE 4 there is schematically illustrated an operation in accordance with the invention wherein a relatively flat and disc-like mandrel is employed for distending the freshly extruded film tube 16. A similar type of disc-like mandrel is illustrated in FIGURE 5 in an operation similar to that described in connection with the first figure of the drawing wherein the mandrel has a smaller diameter than the extrusion orifice 14. The mandrel 28 of FIGURE 4 has a diameter larger than the orifice of the die 10. As is apparent, mere changes in the diameter of the internal guide mandrel 28 advantageously permits a wide range of tube diameters from a single size of extruder and die head to be manufactured by merely changing the diameter of the internal guide mandrel relative to the diameter of the extrusion orifice. In this way, using the same extruder and die head but with changes in mandrel diameter, flattened tubular products can be made from the same installation having flattened widths that, as a maximum, can easily be as great as 4 to 5 times (or any multiple therebetween) of the minimum width of tube that may be extruded. When such manipulations are entered into, changes in extrusion rate may have to be made if it is desired to maintain a larger tube diameter film at about the same wall thicknesses as a smaller sized product.

The mandrel 28 may be made of any suitable material of construction, inert to the plastic material. In particular cases it may be of nickel, Monel, tantalum, or even steel or other ferrous alloys. It is best provided with a smooth, low friction surface to facilitate unimpeded passage of the film tube thereover and may even be plastic coated or otherwise surface treated to better achieve such end. It is also beneficial for the mandrel to have good thermal conductivity so as to facilitate its heat-exchanging ability.

Frequently, as shown in FIGURE 1, it is desirable to cool the mandrel 28 during operation so as to assist in the film chilling effect and to avoid sticking of the film on the surface of the internal guide while obviating the possibility of overheating the internal surface of the film. This is particularly the case when films requiring quick initial cooling and setting are being extruded, as in the instances when a saran product is involved. To such end a cooling duct 70 may be installed and disposed through the hollow center of the tube die 10 and disposed in heat-exchanging contact or proximity with the mandrel 28. A suitable coolant 72 (such as chilled water or brine, from any suitable source of supply not shown) may be circulated through the duct 70 to accomplish the mandrel cooling action and to simultaneously, if desired, maintain a satisfactorily low temperature condition within the freshly extruded tube 16. A baffle separator or divider 75 may be placed within the duct 70 to facilitate circulation of the coolant liquid 72 within the duct 70. Other equivalent mandrel cooling means can be employed. In certain instances, of course, it may not be necessary or even desirable to employ such cooling means. This may be the case when immediate quick cooling to a substantially reduced temperature is not necessary for the film product being made.

Immediately after its extrusion, the freshly extruded and solidified tube of film, while still hot from its recent fused condition, is circumferentially contacted on its exterior portion with a circumenveloping, peripherally cascading column 59 of a temperature regulating liquid that is frequently inert to the film (or which has some beneficial treating influence and effect thereon) and which is at a temperature beneath the thermoplastic fusion temperature of the resinous composition in the film. It may oftentimes be desirable for the first contact of the fresh tubular extrude by the liquid to occur at a distance that is between about ½ and 1½ orifice diameters beneath the orifice 14 of the tube die 10. Likewise, although variations may be employed wherein the internal mandrel 28 is higher than the initial point of contact of the temperature regulating fluid 59, it is usually most advantageous for the point of first liquid impingement on the exterior of the film tube to be slightly above the uppermost film-contacting surface of the mandrel.

The liquid may be supplied through a fluid distributing ring 56, as shown in FIGURE 1, which encircles the freshly extruded tube at about the level of initial liquid contact and exteriorly applies the temperature regulating liquid thereto immediately after its extrusion. The temperature regulating fluid is admitted to the distributing ring 57 through a supply line 54 from a suitable source (not shown) and is passed through the ring in an interior, ring-like channel 55 which communicates with a liquid distributing jet or orifice 58 which directs the liquid in the desired manner about the exterior of the freshly extruded film tube 16. The temperature regulating liquid, as indicated in the foregoing, is non-deleterious or inert to the film being extruded (excepting insofar as it may have some other beneficial treating effect thereon) and, advantageously in many cases, is at a temperature adapted to effect quick cooling and setting up of the film-forming material in the freshly extruded tube. In the instances wherein a saran film is being manufactured, it is advantageous for the temperature regulating liquid to be at a temperature (commonly from 1° to 25° C.) adapted to cause supercooling of the polymer so as to cause its chilling without substantial crystallization. This, of course, facilitates subsequent orientation of films prepared from such normally crystalline polymers.

Figure 6:
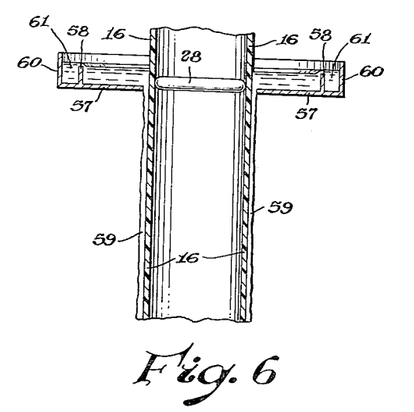
FIGURE 6, in fragmentary cross-sectional elevation, illustrates a varied form of liquid distributing ring suitable for use in the practice of the invention in order to provide the liquid cascade of temperature regulating liquid about the freshly extruded tube.

An alternative variety of liquid distributing ring 57 is illustrated in FIGURE 6 of the drawing. The distributor ring 57 is an open ring pan surrounding the film tube 16 with the central opening spaced to accommodate non-contacting passage of the film tube therethrough. An internal circular baffle or overflow wall 58 is provided concentrically about the central opening in the distributor spaced within the outer wall 60 of the distributor. The space between the outer wall 60 and the inner wall 58 forms a supply channel 61 for the temperature regulating liquid which is filled from any suitable source of supply (not shown) at a suitable rate to maintain the cascading column of liquid about the tube. The ring is continuously overflowing from the inner channel 51 to the central, aperture-containing portion thereof. The diameter of the extruded tube 16 with respect to the diameter of the inside ring forms an annular orifice which meters the water flowing through the ring onto the tube. Such an arrangement is of particular benefit for the provision of the cascading liquid column since it creates minimal radial force of the liquid at its point of contact on the tube and assures that the liquid making up the cascade is provided therefor at a constant minimum pressure head.

In cases where other polymers or film-forming resinous compositions are being utilized, the circumenveloping cascading flow of temperature regulating liquid 59 need not be at a supercooling temperature (particularly since many polymers are not easily susceptible to such phenomenon), but may be at any temperature best adapted for the cooling and setting up of the freshly extruded polymer. Thus, when linear polyethylene compositions are being extruded, it may be advantageous for the temperature regulating liquid, especially when it is an aqueous liquid, to be at a temperature between about 55° C. and the boiling point of water. Other beneficial temperature effects for other film-forming materials are either well known and readily apparent or are easily discerned to those who are skilled in the art.

The length (or height) of the cascading column of liquid should be adequate to secure the desired temperature regulation in the film tube. This, of course, depends on such factors as the mass (and type) of plastic per unit time being handled, especially its thickness, in relation to the quantity of and temperature differential in the circum-enveloping regulating liquid. Ordinarily, the column of liquid should be at least as thick as this film. It is frequently preferable for it to be at least as thick as the film and to have a temperature regulating length for effective heat exchange at least about equal to the diameter of the tube being regulated. Oftentimes a column having a length between about 6 and 20 tube diameters (as based on the diameter of the portion of the tube in contact with the liquid) may be found quite satisfactory for the desired operation. The temperature regulating effect of any liquid column can be readily correlated with any predetermined desired physical characteristics in the film tube.

In addition, as indicated, the temperature regulating liquid 59 may be a beneficial treating liquid for the film having any of the characteristics and adapted to accomplish any of the results mentioned in the foregoing, as well as any other of a similar or analogous nature that may be desired.

There is a phenomenon which occurs in connection with the cascading column of liquid that is of significant and material influence in the initial formation of the freshly extruded tube. This can be described as follows: The cascading water stream, when operating in the manner intended, imparts substantially no inward or collapsing pressure on the extruded tube. This, of course, is absolutely true only when the distributing ring delivers water or other liquid to the tube in such a manner that the radial velocity is substantially zero at the time of contact on the tube. In actual practice, such a condition is not of particular difficulty to achieve for all practical intents and purposes. After application of the cascading liquid column to the tube, gravity takes over to exert a force which is effective in a vertically downward manner on the cascading column of liquid. The surface friction of the flowing stream against the tube slows up the flow of the liquid. The actual water or other liquid velocity at any point beneath the distributing ring in the cascading column of liquid about the tube is considerably less that that which would be had by a free-flowing stream. In addition to this, the outer layer of water in the cascading column tends to flow more rapidly than the inner layer which is in more intimate and immediate contact with the tube. This effect exerts a slight force which is radially outward on the freshly extruded tube. The effect of the radially outward force exerted by the cascading column of liquid on the tube may be aptly described as being somewhat akin to "peeling a banana." This action tends to keep the tube inflated, or rather, in an annular, cross-sectional form.

As indicated in the foregoing, the quantity of beneficial treating liquid that is employed is related to the circumference of the freshly extruded tube and to other factors. Ordinarily, such a quantity of liquid is employed that the temperature elevation which it experiences in its passage through the cascade is generally relatively small due to the relatively small quantity of heat picked up by the liquid from the cooling tube. Ordinarily, temperature rises of only 2 to 5° C. or so are experienced. The most important function of the cascading column of liquid is to thoroughly and uniformly cover the tube with the beneficial treating liquid. The actual thickness of the cascading column is of little consequence excepting to accomplish such function. In as much as the flowing stream in the cascading column of liquid is affected largely by gravity, it theoretically accelerates at the rate of 32.2 ft./sec. However, the friction of the water or other beneficial treating liquid in its passage over the extruded tube does limit the flow rate of the cascading column. If it were not for this fact, the ever-increasing velocity of the downwardly falling cascade of beneficial treating liquid would cause the cascading column to attenuate to such an extent that efficient coverage of the tube would be lost. Thus, the coefficient of friction between the beneficial treating liquid and the extruding tube is a factor relating to the quantity of liquid that must be provided to maintain the cascading column in order to keep the tube covered.

As mentioned, the height of the cascading column of beneficial treating liquid is related to many things, among which are the rate of extrusion, temperature of the cooling or other heat-exchange medium, etc. Highly satisfactory results can ordinarily be obtained in many operations when columns having lengths (or heights) between about 10 and 30 inches or so are utilized although such dimensions are not intended to be construed as limiting of the present invention. Even when cascading columns having substantial heights are employed, the frictional resistance of the liquid on the tube is sufficient to limit the water flow velocity to such an extent that full coverage of the tube by the cascading column is easily maintained.

After being flattened between the nip rolls 20, 21, the collapsed film tube 18 is passed on between a pair of takeup or forwarding rolls 24, 25 operated at any desired peripheral rate of speed relative to the rolls 20, 21, for forwarding to any desired subsequent handling operation. Oftentimes, as has been indicated, the withdrawing of the tube 16 from the die 10 and its passage around or through the flattening means can be accomplished by the advancing or forwarding action of the rolls 24, 25. The subsequent handling of the tube may include orientation by internal bubble distending techniques (with the tube being handled horizontally, vertically or as otherwise desired), pursuant to that illustrated in the referred to Stephenson and Trull patents. Or the film tube may be slit and oriented by flat stretching techniques, or passed directly without being slit or oriented to collection or directly cut into tubular lengths for making bags and the like, with or without orientation, depending in particular cases on the desired handling operation involved and the particular film-forming material utilized.

It is expedient to collect the temperature regulating liquid from about the exterior surface of the freshly extruded tube 16 in a trough 63 from which excess liquid is passed through an overflow 64. The quantity of collected temperature regulating liquid 65 maintained in the trough 63 may, in certain cases, be further used with advantage for additional temperature regulation and control of the freshly extruded film product, especially when the flattening nip rolls 20, 21 are immersed in the liquid in the trough. Thus, when saran is being extruded, the temperature regulating liquid 65 collected in the trough 63 from the cascading liquid column 59 may advantageously be maintained at a continued super-cooling temperature for the film, especially when the temperature regulating liquid is water. Of course, as is apparent, the pair of nip rolls 20, 21 need not be positioned within the liquid 65 collected in the trough 63 but may be placed above the trough which, under such circumstances, may then be used merely for collection of the cascading column of liquid. As a matter of fact, there is no absolute necessity for collecting the temperature regulating liquid from the cascading column in the form of a bath. If preferred, the liquid may merely be disposed of after falling from the external surface of the tube, or it may be recirculated from and back into the system, should such expedient seem desirable. Likewise, especially when a bath collecting trough is dispensed with, the flattened tube 18 need not be deflected after its collapse but can be handled through subsequent processing steps in a physically straight line or substantially vertical direction.

Figure 7:
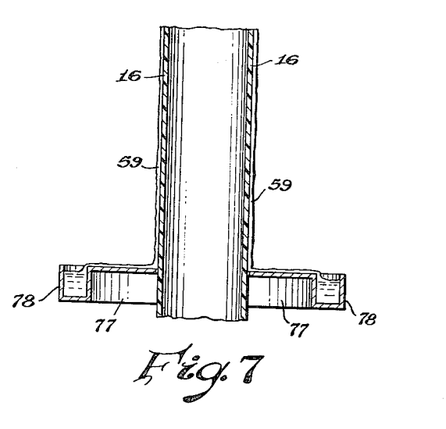
FIGURE 7, in fragmentary cross-sectional elevation, depicts a type of collecting means that may be employed for terminating the liquid cascade at some point along the tube prior to its being collapsed.

In certain instances, it may be desired to intercept or collect the cascading column from the tube prior to the collapse of the tube at some predetermined point along the length of tube after initial application thereto of the cascading column. A device adapted for such purposes is illustrated in FIGURE 7 of the drawing. In essence, the interceptor or external sizing ring 77 is comprised of an annular device having a central aperture that is closely spaced from the tube passing therethrough so as to pick up substantially all (or any desired lesser proportion as may be best suited in particular cases) of the cascading column of liquid 59 falling along the exterior portion of the tube. The collected liquid may be diverted from the interceptor device into an external circumenveloping trough or gutter or by other suitable means not shown for deposition in any desired manner (not shown). Use of such a device or equivalent apparatus means may be quite important in certain instances, particularly in the cases, as mentioned and hereinafter more fully described, where a series of cascading columns of beneficial treating liquid are employed at two operating temperature levels wherein it is desired to collect a substantial percentage or some proportion of the upper stream or streams so as to prevent or accurately control intermixing with immediately and sequentially lower cascading columns.

Beneficially, as mentioned, a dust-laden stream of gas, such as air (or an inert gas, such as nitrogen or carbon dioxide, if preferred or needed), may be circulated within the freshly extruded film tube 16, as illustrated in FIGURE 1, before it is flattened between the rolls 20, 21. This serves to deposit a layer of dust or other pulverulent solid slip agent on the interior surface of the film tube to prevent or substantially minimize its tendency to stick together upon being collapsed. Any suitable dust or dusting compound may be used for such purpose, including starch, talc, mica dust and the like or other pulverulent materials adapted for such purpose for the particular variety of film being manufactured. In the instances when it is desired to thermally seal or weld severed lengths of the dusted film (as in bag-making operations) the dust that is employed may advantageously be a finely divided thermoplastic polymer of a composition that is identical with or similar to and compatible with the polymeric material in the film being manufactured.

The dust-laden supply of gas may advantageously be introduced within the film in the manner illustrated in FIGURE 1 of the drawing. Thus, a supply of suitable dusting compound 48 is maintained in a container 46 therefor. Air (or another desired gas) under pressure is admitted to the container through an inlet conduit 30 for supplying the air from a suitable pressure source not shown. A regulator valve 32 may be utilized to control the pressure of the air. The air passes through an injector or aspirator device of the conventional variety 35, thence on through a pressure line 37, from which it is diverted after passing through a distributor T 38 into a pressure line 39 which exhausts in the dust supply 48 maintained in the container 46. The venting of the air from the pressure line 39 in the container 46 causes a certain quantity of the dusting compound to be picked up and entrained by the air leaving the compound through the dusting tube 50. The dust-laden air is passed through the dusting tube 50 (positioned within the duct 70) down through the center of the tube die 10 and mandrel 28 to be exhausted and circulated within the freshly extruded film tube 16. The dust-laden gas carrying the distributed dust 53 within the film tube circulates therein, generally in the manner indicated by the directional arrows, and is withdrawn, generally bearing a lower content of dust, from the interior of the tube through the recirculating conduit 52. The conduit 52, which is connected to the aspirator 35, serves to vent the tube by means of the vacuum effect caused by initial passage of the air through the aspirator and into the dust container. As is apparent, the vacuum or at least pressure-reducing effect created by the action of the aspirator 35 facilitates circulation and removal of the air bearing residual dust, if any, from the interior of the freshly extruded film tube.

The quantity of dust that is picked up or entrained by the air depends, of course, upon factors that are apparent to those skilled in the art. These include the pressure and quantity of the air being passed through the system and the velocity at which it is vented into the dust supply of the container 46, as well as the density of the dusting material and the fineness or average particle size in which it is employed. A balancing valve 41 positioned in the air vent line 40 connected to the outlet of the distributor T 38 is utilized for precise regulation of the air pressure in the system. A collector bag or other dust straining, entrapping and/or wetting device 44 (such as a cyclone separator) may be placed at the outlet of the balancing valve 41 to catch any dust that may be carried with the air being vented from the system.

Another effective way for distributing the dust or other solid slip agent within the tube is to direct compressed air through a dust supply and then directly into the tube from which the air is withdrawn directly by means of a suction blower in a manner not illustrated in the drawing. Other suitable means for depositing dust within the tube may employ two separate air streams; one of which picks up and deposits the dust within the tube and the second of which is passed through an ejector to create a suction for withdrawing the air and spent dust from within the tube. Likewise, mechanical shaking or dusting devices which do not depend upon carrying of the dust in a stream of compressed air can be suitably employed, in which instances the dust is mechanically distributed within the tube and there is no forced passage of dust-bearing gas to the interior of the freshly extruded tube.

The quantity of dust that is deposited within the film tube depends similarly upon the specfic gravity, fineness and propensity for entrainment of the dusting compound being utilized. Obviously, the decrease in velocity of the dust-laden gas leaving the dusting tube 50 within the freshly extruded film tube 16 permits a desired quantity of the dust to fall out of entrainment in the gas upon the interior surface of the film. Suitable quantities can be easily achieved by regulation of the air flow and choice of dusting compound as well as by control of the velocity of the gas through the dusting tube 50. As indicated, a certain amount of dust may not deposit but may be carried with the gas being recirculated within the tube 52. Usually, some proportion of this dust (depending upon specific operating conditions) is carried during the recirculation back through the dust supply although, as is apparent in the foregoing, some of the dust may pass out with the air through the vent 40 being exhausted from the system. In most cases 80 to 90 percent or more of the dust is deposited within the film tube.

In certain instances the dust-laden gas passed within the tube 16 may be maintained therein under a sufficient pressure to materially assist in maintaining the tubular form of the extrude until its purposeful flattening. In any event, it is usually beneficial to avoid substantial subatmospheric pressure or large positive vacuum effects within the tube so as to eliminate any premature or excessive collapsing tendency therein. Negative pressures of several tenths of an inch of water under atmospheric pressure can be employed without excessive tube collapse.

Although the circumenveloping, cascading column of temperature regulating liquid 59 may be at a uniform or substantially uniform temperature during the operation, it is possible and may frequently be quite desirable, as has been mentioned, to alter the temperature of the liquid during its passage over the exterior of the freshly extruded film tube. Thus, the temperature of the liquid after being first applied so as to initially chill and set the freshly extruded film, may sequentially be raised before flattening of the film tube in order to elevate the temperature of the film to one at a level that may tend to be more favorable for better stretching and orientation. This may be accomplished in various ways, one of which is illustrated schematically in FIGURE 2 of the accompanying drawing. As therein shown, the freshly extruded film tube 16 is first passed through a first or upper liquid distributing ring 68 wherein a temperature regulating liquid, such as water 69, is initially applied at a desired cooling or setting temperature for the film. After the cooling effect has been accomplished, the temperature of the liquid may be elevated by adding warmer water or other liquid through a second or lower distributing ring 73 which is positioned about the tube beneath the first distributing ring 68 at a greater distance from the outlet of the tube die than the first ring. The warmer liquid from the second distributing ring 73 blends with the liquid in the upper column 69 so as to produce a lower cascading column 77 having an elevated temperature adapted to place the film in better condition for subsequent orientation or for other subsequent handling purposes which may be accomplished, in any desired manner, as indicated in the foregoing. Of course, a converse operation may also be effected wherein a hotter liquid first applied to the film is cooled by subsequent application of a second circum-enveloping supply at a lower temperature adapted to effect the desired temperature regulation of and alteration in the film. Likewise, more than two successive temperature regulations can be achieved in a similar manner by any desired applicating sequence of increasingly warmer or increasingly cooler temperature regulating liquids or, if desired and necessary for some given purpose, by a series of any desired sequential plurality of circumenveloping temperature regulating liquids applied at intermittently cooler and warmer temperatures.

Heat lamps, steam sprays and the like can also be employed for altering the temperature of the liquid cascade at some intermediate longitudinal point. As mentioned, when more than a single cascading column of liquid is utilized, it may be desirable to intercept or collect upper columns from about the tube to prevent substantial intermixing with lower liquid columns using apparatus of the type described and illustrated in connection with FIGURE 7 of the drawing. Such interception, incidentally, may also be of benefit when diverse varieties of treating liquids are being employed in sequential cascading columns in order to circumvent the possibility of interaction or contamination between the treating liquids utilized.

Figure 3:
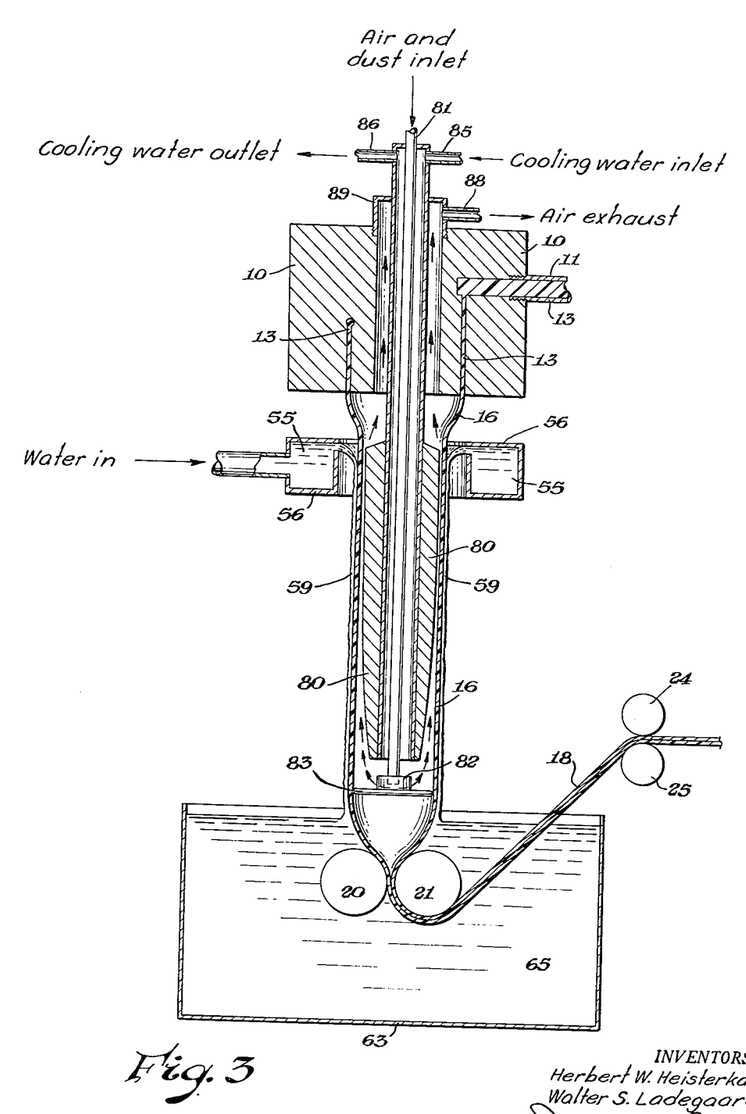
FIGURE 3 illustrates a variation in the practice of the invention wherein an internal non-contacting tube guiding and forming mandrel is utilized during the operation.

In addition, as indicated in the foregoing, other varieties of tube guides may be employed within or without the freshly extruded tube. One such means which is of great benefit in the practice of the present invention is an internal mandrel which does not actually contact the tube. Such a device is shown in FIGURE 3 of the drawing wherein the tube 16 is extruded about a profiled mandrel 80 which is patterned somewhat in the general form of a carrot. In the use of such a mandrel, air or other gas under pressure (which may or may not be laden with dust, as desired in particular instances) is introduced from a supply conduit 81 through the center of the die which extends downwardly through the mandrel 80 to terminate in a distributor element 82. A baffle plate 83 which seals the inner portion of the tube at its lower extremity and keeps the already set tubular film distended prior to its collapse is positioned at the lower end of the air supply conduit 81. The carrot mandrel 80, disposed aobut a cooling pipe 84, having a coolant inlet 85 and coolant outlet 86, respectively, and encircling the air conduit 81, is precisely shaped in such a manner that the cross-sectional area at any point of elevation on the mandrel from its lowermost to its upper extremities leaves a decreasing annular area as the space remaining between the cylindrically shaped extruded tube 16 and the center carrot mandrel or former 80. The air under pressure passed through the inlet conduit 81 exhausts upwardly about the mandrel 80 and may be passed through the center of the tube die 10 for final venting through an annular space in the die from which it passes through an exhaust pipe 88 positioned on a cap 89.

The basic principle employed in the utilization of non-contacting carrot mandrel 80 is based on Bernoulli's Theorum. This states that in a flowing liquid stream the sum of the pressures at any point in such stream, made up of the static pressure, velocity pressure and resistance pressure, is always equal to the sum at any other point in the stream. Thus, by altering the velocity of the flowing stream by changing the shape of the area through which it flows, the static pressure of the stream can be changed. In the bottom portion of the tube 16, the annular area between the carrot mandrel 80 and the tube 16 is such that, with the quantity of gas under pressure being circulated, the velocity is very low and, therefore, velocity pressure is negligible. As the space between the mandrel 80 and the tube decreases upwardly, the flowing stream of gas under pressure undergoes an increase in velocity pressure sufficient to mtaintain the tube in effectively guided disposition about the mandrel without actual contact occurring between the mandrel and the interior surface of the tube. In this way, the flowing air stream around the circumference of the mandrel 80 permits the tube 16 to be drawn up closely to the mandrel and satisfactorily guided thereabout while being maintained separate therefrom by the moving air stream so as to lubricate the passage of the tube over the mandrel with air or other gas. As mentioned, the flowing air stream may also be advantageously employed for carrying dust to the interior of the tube. Since, as indicated, the cascading column of liquid exerts a practically negligible force (or none whatever) in a radially inward direction on the tube, it is not necessary when employing a non-contacting carrot mandrel of the type described to use extremely high velocities of the gas under pressure in order to create the desired balance between the guided tube and the mandrel.

Figure 8:
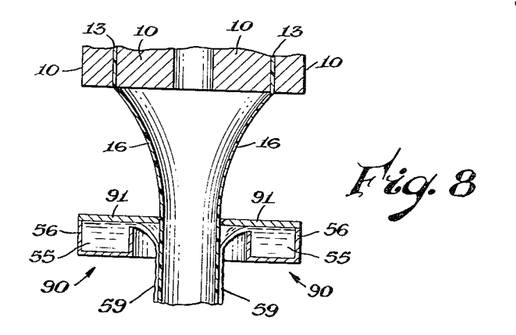
FIGURE 8, in fragmentary cross-sectional elevation, illustrates another varied arrangement in the practice of the invention wherein an external tube guide is employed.

Another advantageous means for guiding the tube after its extrusion in combination with the cascading column of liquid of the present invention is to use an external contacting guide of the type illustrated in FIGURE 8 of the drawing which, advantageously, may be combined with the liquid distributor 56 that provides the cascading column of liquid 59 about the tube. Thus the external guide ring 91 for contacting and guiding the tube 16 on its exterior surface may be comprised of the guide ring member 91, having an internal tube contacting aperture, which is formed as the top plate of the liquid distributor 56. Such an external former or its equivalent may frequently be beneficial for the preparation of tubing having a smaller diameter than the annular die size. It is also an advantageous arrangement to employ for highly effective internal dusting of the tube using mechanical or gas pressure dusting means for the purpose.

Figure 2:
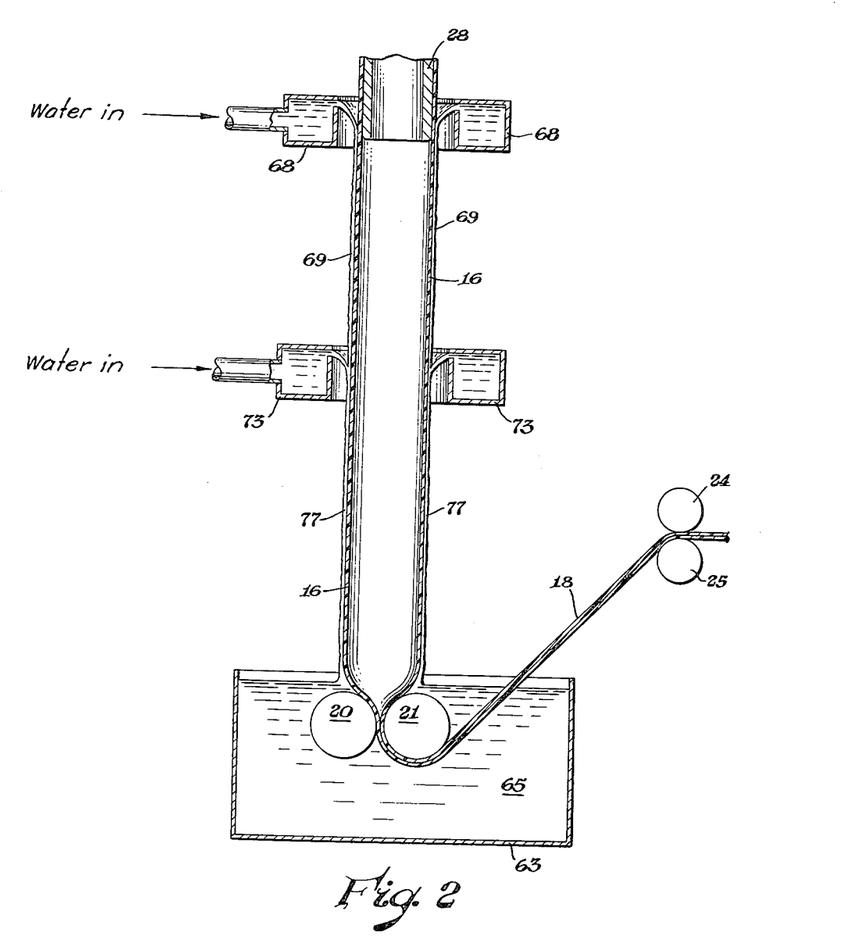
FIGURE 2 illustrates a modified embodiment of the invention for regulating the temperature of the freshly extruded film in a more complex manner.

Of course, as has been mentioned and as can be inferred from FIGURE 2 of the drawing, it may sometimes be possible to operate satisfactorily without any internal or external guiding and forming means within the freshly extruded tube prior to flattening. This is especially the case when a gas is circulated within the tube under a pressure adapted to maintain the tubular form, either with or without substantial distension thereof (or even during contraction of the tubular extrude). Thus, orientation simultaneous with extrusion can also be accomplished in the practice of the present invention. Generally, however, it is quite preferable to employ some variety of internal guiding and forming-assisting means, especially an internal solid mandrel, within the freshly extruded tube.

Excellent quality thin wall film tubes having exceptional uniformity and highly desirable characteristics may easily and advantageously be prepared by practice of the present method and utilization of the present apparatus. The particularly and unusually accurate temperature control of the freshly extruded film that is achieved by the exterior cascading column of temperature regulating liquid is especially instrumental in securing such desideration. As is apparent, it readily permits extremely close and critical temperature regulation in any desired manner of the freshly extruded film tube. Furthermore, the desired effect or effects is or are efficaciously accomplished at one of the most crucial points of the film manufacturing operation. In addition, as indicated, the same sized extruder and die head assembly can be utilized in the practice of the invention to produce film tubes of excellent quality having an advantageously wide range of diameter. This provides for great flexibility in the manufacturing operation.

As indicated, practice of the present invention is particularly useful for manufacture of saran film tubes, including those that consist of homopolymers of vinylidene chloride as well as normally crystalline copolymers thereof, as may be determined by X-ray diffraction studies. These include copolymers of vinylidene chloride with vinyl chloride, acrylonitrile and the like that generally contain in the polymer molecule at least about 70 and preferably at least about 80 weight percent of the comonomer (or mixture of comonomers) polymerized with the vinylidene chloride. In addition to saran films, practice of the present invention may advantageously be made for the preparation of films comprised of such thermoplastic film-forming materials as the various styrene polymers, including polystyrene, film-forming copolymers of styrene with acrylonitrile, α-methyl styrene, ethyl acrylate and the like and mixtures thereof as well as for various vinyl toluene polymers, vinyl chloride polymers, vinyl chloride/vinyl acetate copolymers, acrylonitrile polymers, cellulose acetate, cellulose acetate butyrate and other thermoplastic, film-forming derivatives of cellulose, non-aromatic hydrocarbon polyolefins, including polyethylene (of both the conventional branch structured "polythene"-type of polymer and the more recently available linear, so-called macromolecular, high density varieties) and polypropylene, chlorinated and other halogen derivatives of polyethylene and polypropylene, polyamides, including linear condensation products of adipic acid and hexamethylene diamine (nylon "66") and condensation products of epsilon-caprolactam (nylon "6") and the like, film-forming polyesters including linear condensation products of terephthalic acid and ethylene glycol ("Mylar") and the like glycols, and the like or analogous thermoplastic resinous film-forming compositions.

In order to further illustrate the invention, a plastified, crystalline, film-forming copolymer of vinylidene chloride and vinyl chloride that contained about 85 weight percent of vinylidene chloride in the polymer molecule was extruded at a rate of about 60 pounds per hour at its fusion temperature of about 173° C. through a tube forming orifice having an outside diameter of about 2.0 inches and an orifice opening having a radial thickness of about 0.030 inch. The hot tube was passed downwardly from the orifice over an internal mandrel supported from the tube die and positioned with its upper extremity about 1 inch under the orifice. The metal mandrel had a smooth-surfaced diameter of about 1⅛ inches and a thickness of about ¼ inch. The mandrel was formed so as to have approximate line contact with the tube inasmuch as the ¼ inch thickness had a ⅛ inch radius forming a convex contour. Immediately after extrusion, the freshly extruded film tube was supercooled by exterior application of a substantially uniform, circumenveloping cascading column of water at an average temperature of about 15° C. The column of water was applied to the exterior of the tube from a ring-like distributing member encircling the tube and having an inner, radially slit jet or nozzle for directing the water on the freshly extruded tube. The distributing member for the temperature regulating water was positioned at about mandrel elevation beneath the extrusion orifice and the water was applied therefrom at a rate of about 1 gallon per minute to the freshly extruded film tube. The cascading column of water remained in contact with the film tube for a distance of about 8 inches before collecting as a cooling bath wherein the tube was flattened. The film tube was collapsed and flattened out, after being withdrawn from the orifice and cooled, between a pair of nip rolls rotating to draw the film tube from the die and positioned at a distance of about 13½ inches under the orifice of the tube die.

During the operation, compressed air carrying starch dust suitable for saran film was passed within the film tube in the manner set forth in FIGURE 1. The air was forced through the starch supply and withdrawn therefrom with entrained starch through a small distributing line. The end of the starch distributing tube was slightly flared. The air admitted to the tube was recirculated to an aspirator device by means of a recirculating tube of the same diameter as the dusting tube. The aspirating device was connected to the air inlet conduit in which the compressed air was admitted to the system. About 90 percent of the starch was thus uniformly applied to the interior surface of the tube prior to its collapse.

After passing the flattening rollers, the tube, which had a single film thickness of 13 mils, was oriented by being stretched by an internal bubble distending operation with the stretching tube being passed vertically upwardly, similar to that disclosed in U.S. 2,452,080. By the foregoing operation, an excellent quality saran film having an average single film wall thickness of about 1.2 mils was produced in which the mean variation of thickness from the average was negligible.

By way of still further illustration, the foregoing general procedure for the preparation of excellent quality saran tubing having oriented single wall thicknesses of from 1.2 to 1.5 mils (after distending of collapsed tubes having 13 to 16 mil single wall thicknesses) using extruding rates in the range from about 60 to 90 pounds per hour with the same two inch O.D. tubing die. The internal mandrel formers employed had diameters varying between 1⅛ and 2⅞ inches to produce flattened tubular film after orientation having widths of from 6 to 16 inches. The cascading water column was varied in temperature between 2 and 15° C. and was employed at circulation rates in the range from 1 to 3 gallons per minute. Excellent results in each instance were obtained when the changes of the mentioned variations within the indicated ranges were employed.

The method of the invention may also be utilized in the described manner for the manufacture of other thermoplastic film tubes wherein the temperature regulating liquid is other than water and/or is applied at a temperature above a supercooling temperature or is regulated in its passage as a column over the exterior of the film tube through any varying temperature regulating sequence.

The scope and purview of the present invention is to be gauged in the light of the hereto appended claims rather than strictly from the foregoing illustrative description and specification.

What is claimed is:

1. Method of producing film from a thermoplastic film-forming material which comprises extruding a fused thermoplastic film-forming composition generally downwardly through an orifice in the form of a seamless film tube; withdrawing said freshly extruded film tube generally downwardly away from said die; and continuously applying to said tube immediately after its extrusion an unconfined and free-flowing circumenveloping column of a liquid which is at a temperature beneath the fusion temperature of said film-forming composition.

2. Method of producing film from a thermoplastic resinous film-forming material which comprises extruding a fused thermoplastic film-forming composition through a generally circular extrusion orifice in a tube die downwardly in the form of a seamless film tube; withdrawing said freshly extruded film tube downwardly away from said die; flattening said withdrawn film tube against a flattening means positioned at a distance beneath said die; continuously applying to the exterior of said tube immediately after its extrusion and prior to its flattening an unconfined and free-flowing circumenveloping column of a temperature regulating liquid which is at a desired temperature beneath the thermoplastic fusion temperature of the resinous composition in said film; and subsequently taking up said flattened film from said flattening means.

3. Method of producing film from a thermoplastic resinous film-forming material which comprises extruding a fused thermoplastic film-forming composition through a generally circular extrusion orifice in a tube die downwardly in the form of a seamless film tube; withdrawing said freshly extruded film tube downwardly away from said die through and within an external centering and controlling means disposed about said film which contacts said film tube about its exterior peripheral surface; flattening said withdrawn film tube about a flattening means positioned at a distance beneath said die; continuously applying to the exterior of said tube immediately after its extrusion and contact by said external guide and prior to its flattening an unconfined and free-flowing, circumenveloping peripherally cascading column of a temperature regulating liquid which is at a desired temperature beneath the thermoplastic fusion temperature of the resinous composition in said film; and subsequently taking up said flattened film from said flattening means.

4. Method of producing film from a thermoplastic resinous film-forming material which comprises extruding a fused thermoplastic film-forming composition through a generally circular extrusion orifice in a tube die downwardly in the form of a seamless film tube; withdrawing said freshly extruded film tube downwardly away from said die over and about an internal centering and controlling means disposed within said film tube which supports said film tube on its inner peripheral surface; flattening said withdrawn film tube about a flattening means positioned at a distance beneath said die; continuously applying to the exterior of said tube immediately after its extrusion and prior to its flattening an unconfined and free-flowing, circumenveloping peripherally cascading column of a temperature regulating liquid which is at a desired temperature beneath the thermoplastic fusion temperature of the resinous composition in said film; and subsequently taking up said flattened film from said flattening means.

5. The method of claim 4, wherein said freshly extruded film tube is passed downwardly away from said die over and about an internal, solid, generally circular centering guide rigidly positioned within said tube which is maintained physically out of contact with the inner peripheral surface of said film tube by means of an annular flowing stream of gas passing upwardly between said guide and said film tube.

6. Method of producing film from a thermoplastic resinous film-forming material which comprises extruding a fused thermoplastic film-forming composition through a generally circular extrusion orifice in a tube die in the form of a seamless film tube; withdrawing said freshly extruded film tube downwardly away from said die over a cooled, internal, solid, generally circular, centering mandrel guide which contacts said film tube on its inner peripheral surface and is adapted to exchange heat from said freshly extruded film and to maintain the interior of said film tube cool; flattening said withdrawn film tube about a flattening means positioned at a distance beneath said die; continuously applying to the exterior of said tube immediately after its extrusion and prior to its flattening an unconfined and free-flowing, circumenveloping, peripherally cascading column of a temperature regulating liquid which is at a desired temperature beneath the thermoplastic fusion temperature of the resinous composition in said film and which is maintained in contact with the exterior of said film for at least a substantial portion of its travel prior to flattening; and subsequently taking up said flattened film from said flattening means.

7. The method of claim 6, wherein said thermoplastic composition is a normally crystalline polymer of vinylidene chloride and wherein said temperature regulating liquid is an aqueous liquid that is at a supercooling temperature for the polymer in said film.

8. The method of claim 6, wherein said column of temperature regulating liquid is initially applied to said film tube at a distance that is between about ½ and 1½ orifice diameters beneath the orifice of said die.

9. The method of claim 6, and including, in addition thereto and in combination therewith, the step of circulating a dust-laden gas within said film tube being extruded prior to its flattening and depositing dust on the inner surface of said film tube from said dust-laden gas.

10. The method of claim 6, wherein said cascading column of temperature regulating liquid is initially applied to said film tube at a level at least as high and not further from said tube die as the uppermost portion of said internal mandrel.

11. The method of claim 6, and including, in addition thereto and in combination therewith, the subsequential step after the withdrawing of said flattened film tube from said flattening means of stretching said film tube for orienting the film product therein.

12. Apparatus for manufacturing film from thermoplastic film-forming materials which comprises, in cooperating combination, means for extruding a seamless film tube generally downwardly; means for applying to the surface of said film tube immediately upon its extrusion an unconfined and free-flowing, circumenveloping, peripherally cascading column of a liquid at a temperature beneath the fusion temperature of the thermoplastic material in said film tube; and means for forwarding said film tube from said extrusion means.

13. Apparatus for manufacturing film from thermoplastic resinous film-forming materials which comprises, in cooperating combination, a tube die adapted to extrude a seamless film tube downwardly; means positioned beneath said die for flattening said freshly extruded film tube; means for applying to the exterior surface of said film tube immediately upon its extrusion an unconfined and free-flowing, circumenveloping, peripherally cascading column of a temperature regulating liquid; and means for withdrawing and taking up said flattened film tube from said flattening means.

14. Apparatus for manufacturing film from thermoplastic resinous film-forming materials which comprises, in cooperating combination, a tube die adapted to extrude a seamless film tube downwardly; means adapted to be disposed without and circumferentially about a tube of film freshly extruded from said die for exteriorly contacting the outer peripheral surface of said film tube to guide and form said tube during and immediately after its extrusion, said external guiding and forming means being positioned beneath said tube die; means positioned beneath said die and beneath said external guide and forming means for flattening said freshly extruded film tube; means for applying to the exterior surface of said film tube, immediately upon its extrusion, an unconfined and free-flowing, circumenveloping, peripherally cascading column of a temperature regulating liquid; and means for withdrawing and taking up said flattened film tube from said flattening means.

15. Apparatus for manufacturing film from thermoplastic resinous film-forming materials which comprises, in cooperating combination, a tube die adapted to extrude a seamless film tube downwardly; means adapted to be disposed within a tube of film freshly extruded from said tube die for interiorly contacting the inner surface of said film tube to guide and form said tube during and immediately after its extrusion, said internal guiding and forming means being positioned beneath said tube die; means positioned beneath said die and beneath said internal guide and forming means for flattening said freshly extruded film tube; means for applying to the exterior surface of said film tube, immediately upon its extrusion, an unconfined and free-flowing, circumenveloping, peripherally cascading column of a temperature regulating liquid; and means for withdrawing and taking up said flattened film tube from said flattening means.

16. The apparatus of claim 15, wherein said internal guiding and forming means is a liquid column adapted to be disposed within a film tube when it is extruded from said die and to be positioned therein above said flattening means.

17. Apparatus for manufacturing film from thermoplastic resinous film-forming materials which comprises, in cooperating combination, a tube die adapted to extrude a seamless film tube downwardly; a generally circular solid guiding and forming mandrel adapted to be positioned within a film tube beneath said tube die when such tube is extruded from said tube die, said guiding and forming mandrel adapted to contact the entire inner peripheral portion of a film tube shortly after it has been extruded from said film die; means positioned beneath said die and said mandrel for flattening said freshly extruded film tube; means for circulating a dust-laden gas within said film tube when it is being extruded from said tube die and about said mandrel, said gas circulating means being adapted to deposit dust on the inner surface of said film tube prior to its flattening; means for applying to the exterior surface of said film tube immediately upon its extrusion, an unconfined and free-flowing, circumenveloping, peripherally cascading column of a temperature regulating liquid; and means for withdrawing and taking up said flattened film tube from said flattening means.

18. The apparatus of claim 17, wherein said internal guiding and forming mandrel is provided with heat exchanging cooling means.

References Cited in the file of this patent
UNITED STATES PATENTS

| | | |
|---|---|---|
| 2,324,397 | Hull | July 13, 1943 |
| 2,433,937 | Tornberg | Jan. 6, 1948 |
| 2,519,375 | Jargstorff et al. | Aug. 22, 1950 |
| 2,708,772 | Moncrieff | May 24, 1955 |
| 2,720,680 | Gerow | Oct. 18, 1955 |
| 2,814,071 | Allan et al. | Nov. 26, 1957 |
| 2,863,172 | Buteux et al. | Dec. 9, 1958 |
| 2,902,716 | Colombo | Sept. 8, 1959 |
| 2,945,258 | Houston | July 19, 1960 |
| 2,955,321 | Fortner et al. | Oct. 11, 1960 |